United States Patent
Heit et al.

(10) Patent No.: US 9,518,744 B2
(45) Date of Patent: *Dec. 13, 2016

(54) METHOD AND APPARATUS FOR COOKING USING CODED INFORMATION ASSOCIATED WITH FOOD PACKAGING

(71) Applicants: Ryder C. Heit, Los Altos Hills, CA (US); Warren S. Heit, Los Altos Hills, CA (US)

(72) Inventors: Ryder C. Heit, Los Altos Hills, CA (US); Warren S. Heit, Los Altos Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/875,412

(22) Filed: Oct. 5, 2015

(65) Prior Publication Data
US 2016/0025349 A1 Jan. 28, 2016

Related U.S. Application Data

(63) Continuation of application No. 13/801,983, filed on Mar. 13, 2013, now Pat. No. 9,194,591.

(51) Int. Cl.
| | |
|---|---|
| *G06K 7/01* | (2006.01) |
| *F24C 3/12* | (2006.01) |
| *G06K 7/00* | (2006.01) |
| *G06K 7/10* | (2006.01) |
| *G06K 7/14* | (2006.01) |
| *F24C 15/00* | (2006.01) |
| *B65D 25/20* | (2006.01) |
| *F24C 7/08* | (2006.01) |
| *B65D 81/34* | (2006.01) |

(52) U.S. Cl.
CPC ............ *F24C 3/124* (2013.01); *B65D 25/20* (2013.01); *B65D 81/3446* (2013.01); *F24C 7/082* (2013.01); *F24C 7/085* (2013.01); *F24C 15/00* (2013.01); *G06K 7/00* (2013.01); *G06K 7/10009* (2013.01); *G06K 7/1404* (2013.01); *B65D 2203/10* (2013.01)

(58) Field of Classification Search
CPC .................. G06K 7/01; G06K 17/00
See application file for complete search history.

(56) References Cited

U.S. PATENT DOCUMENTS

2014/0263640 A1* 9/2014 Heit .................. G06K 7/00
235/435

* cited by examiner

*Primary Examiner* — Christle I Marshall

(57) ABSTRACT

A cooking apparatus capable of reading or detecting coded information printed on or otherwise associated with food packaging is provided. Food packaging capable of being read or detected by a cooking apparatus is also provided. The cooking apparatus sets cooking time and cooking temperature as a result of reading or detecting coded information printed on or otherwise associated with food packaging. The cooking apparatus is capable of interacting with a user of the cooking apparatus to further assist the cooking process started as a result of reading or detecting coded information printed on or otherwise associated with food packaging. The cooking apparatus capable of connecting to a remote computer and server and receiving and displaying web pages generated by the remote server to further assist the cooking process.

5 Claims, 9 Drawing Sheets

| | | |
|---|---|---|
| FIELD 1 | FOOD IDENTIFIER | |
| FIELD 2 | FOOD QUANITY | |
| FIELD 3 | BATCH IDENTIFIER | EXPIRATION DATE |
| FIELD 4 | IP ADDRESS | |
| FIELD 5 | FIRST PROCESS IDENTIFIER | FIRST PROCESS INFORMATION |
| FIELD 5 | SECOND PROCESS IDENTIFIER | SECOND PROCESS INFORMATION |

...

| | | |
|---|---|---|
| FIELD N | NTH PROCESS IDENTIFIER | NTH PROCESS INFORMATION |

| | | | |
|---|---|---|---|
| FIELD 1 | LENGTH | FOOD IDENTIFIER | |
| FIELD 2 | LENGTH | FOOD QUANTITY | |
| FIELD 3 | LENGTH | BATCH IDENTIFIED  EXPIRATION DATE | |
| FIELD 4 | LENGTH | IP ADDRESS | |
| FIELD 5 | LENGTH | FIRST PROCESS IDENTIFIER | FIRST PROCESS INFORMATION |
| FIELD 6 | LENGTH | SECOND PROCESS IDENTIFIER | SECOND PROCESS INFORMATION |

...

| | | | |
|---|---|---|---|
| FIELD N | LENGTH | NTH PROCESS IDENTIFIER | NTH PROCESS INFORMATION |

FIG. 2

Baked Meat Lasagna   12oz

Pre-heat oven to 450 degrees.
Oven will sound when oven pre-heated.
Insert lasagna after pre-heating complete.
Bake lasagna at 450 degrees for 30 mins.
Oven will sound when cooking complete.

( HELP ME )  ( SPEAK WITH EXPERT )
( NEXT STEP )  ( PREV STEP )
( START )  ( SKIP )

---

Baked Meat Lasagna   12oz

Pre-heat oven to 450 degrees.
Oven will sound when oven pre-heated.

( HELP ME )  ( SPEAK WITH EXPERT )
( NEXT STEP )  ( PREV STEP )
( PREHEATING... )

---

Baked Meat Lasagna   12oz

Oven is properly preheated.
Remove film covering lasagna.
Insert lasagna in oven and close door
Bake lasagna at 450 degrees for 30 mins.
Oven will sound when cooking complete ( HELP ME )  ( SPEAK WITH EXPERT )
( NEXT STEP )  ( PREV STEP )
( START )  ( OVEN OFF )

FIG.6

Baked Meat Lasagna   12oz     HELP ME   SPEAK WITH EXPERT
                                   NEXT STEP   PREV STEP Skipping preheating and going direct to baking.
Is the lasagna frozen or defrosted?     FROZEN   DEFROSTED

---

Baked Meat Lasagna   12oz     HELP ME   SPEAK WITH EXPERT
                                   NEXT STEP   PREV STEP Remove film covering lasagna.
Insert lasagna in oven and close door
Bake lasagna at 450 degrees for 30 [45] mins.    START
Oven will sound when cooking complete

FIG. 7

Baked Meat Lasagna   12oz    [HELP ME] [SPEAK WITH EXPERT]
                              [NEXT STEP] [PREV STEP]

*Cooking* complete – Lasagna is ready!
Remove carefully...Enjoy!

Tell me how the lasagna was cooked so next time we can change the cooking process to make it perfect.

[VERY UNDERDONE] [UNDERDONE] [PERFECT!] [OVERDONE] [VERY OVERDONE]

FIG. 8

METHOD AND APPARATUS FOR COOKING USING CODED INFORMATION ASSOCIATED WITH FOOD PACKAGING

FIELD OF THE INVENTION

The preset invention relates to an improved cooking method and apparatus therefor associated with food packaging having readable encoded information. More particularly, the improved cooking method and apparatus of the present invention includes reading encoded information contained on or associated with food packaging for food, cooking the food according to the encoded information and providing an interactive cooking environment.

BACKGROUND OF THE INVENTION

Advancements in semiconductor, electronic and display technologies have resulted in remarkable new ways for individuals to accomplish daily tasks. Devices like smartphones tablets, and notebook computers, and their ability to connect over the internet, give the users of these devices brand new ways to access a world of information in a intuitive easy to use manner. At the tap of their fingers, users can gain access to untold wealth of information and the ability to connect with other uses.

The kitchen has been largely let out of this technology leap forward. For the most part, conventional ovens, microwave ovens and toaster ovens continue to be manufactured and used in the same way that they were built for the past decades. They include manual controls (e.g., knobs, buttons, etc.) by which the cook manually program these kitchen tool to perform their functions. Whether operating from a written recipe or the instructions on the back of food packaging, the cook will manually input cooking instructions into the oven to cook the food.

There is a need for an improved cooking method and apparatus that allows the therefor that provides everyday people to use the power of today's electronics and display technologies.

SUMMARY OF THE INVENTION

In accordance with one embodiment of the invention, food packaging is provided having encoded information. The encoded information for example is printed on the side of the packaging for example using QR codes or associated with the packaging using tags such as RFID tags or near field communication device. The encoded information is capable of being read by a sensor or detector associated with cooking apparatus in accordance with the invention. The encoded information read by the sensor or detector associated with the cooking apparatus informs the cooking apparatus how to cook the food associated with the food packaging.

In accordance with another embodiment of the invention, a cooking apparatus is provided comprising a cooking housing containing a controllable cooking element for cooking food; the cooking housing having at least one manually actuable input device for manually inputting an instruction to cook the food; the cooking housing further having a sensor for reading first information contained on food packing brought proximate to the housing; a microprocessor contained within the housing for receiving second information from the sensor relating to the first information read from the food packaging; the manually actuatable input device controllably connected to the controllable cooking element for controlling the cooking of food; and the microprocessor controllably connected to the controllable cooking element for controlling the cooking of food based on the second information.

In accordance with another embodiment of the invention, the cooking apparatus further comprises a touch-sensitive flat panel display element for displaying words, pictures, videos and/or other images to the user of the cooking apparatus, a speaker for audibly producing sounds, and a microphone for receiving audible spoken words. The words, pictures, videos and/or other images displayed on the flat panel display element and audible sounds are generated in connection with the reading or detecting coded information printed on or otherwise associated with food packaging. The user of the cooking apparatus interacts with the cooking apparatus via touching the touch-sensitive flat panel display element and speaking into the microphone.

In accordance with another embodiment of the invention, the cooking apparatus further comprises a communication device such as an IEEE 802.11 WIFI device or Ethernet device for allowing the cooking apparatus to bidirectionally communicate with a remotely located server via the Internet or other network. The cooking apparatus sends and retrieves cooking information to and from the remote server via the internet connection. As a result, an enhanced interaction between the cooking apparatus and user of the cooking apparatus is achieved.

For purposes of summarizing the advantages achieved over the prior art, certain advantages have been described herein above. Of course, it is to be understood that not necessarily all such advantages may be achieved in accordance with any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

All of these embodiments are intended to be within the scope of the invention. These and other embodiment will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

FIG. 2 is a schematic illustration of food packaging information in accordance with an embodiment of the present invention;

FIG. 6 illustrates examples of graphical interfaces in accordance with an embodiment of the present invention;

FIG. 7 illustrates additional examples of graphical interlaces in accordance with an embodiment of the present invention;

FIG. 8 illustrates additional examples of graphical interfaces in accordance with an embodiment of the present invention.

DETAILED DESCRIPTION OF THE
EMBODIMENTS OF THE INVENTION

The present invention will now be described with reference to FIGS. 1-9 which in embodiments relate to an improved cooking method and apparatus therefor associated with food packaging having readable encoded information. More particularly, the improved cooking method and apparatus of the present invention includes reading encoded information contained on or associated with food packaging for food, cooking the food according to the encoded information and providing an interactive cooking environment it is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

Figure 1:
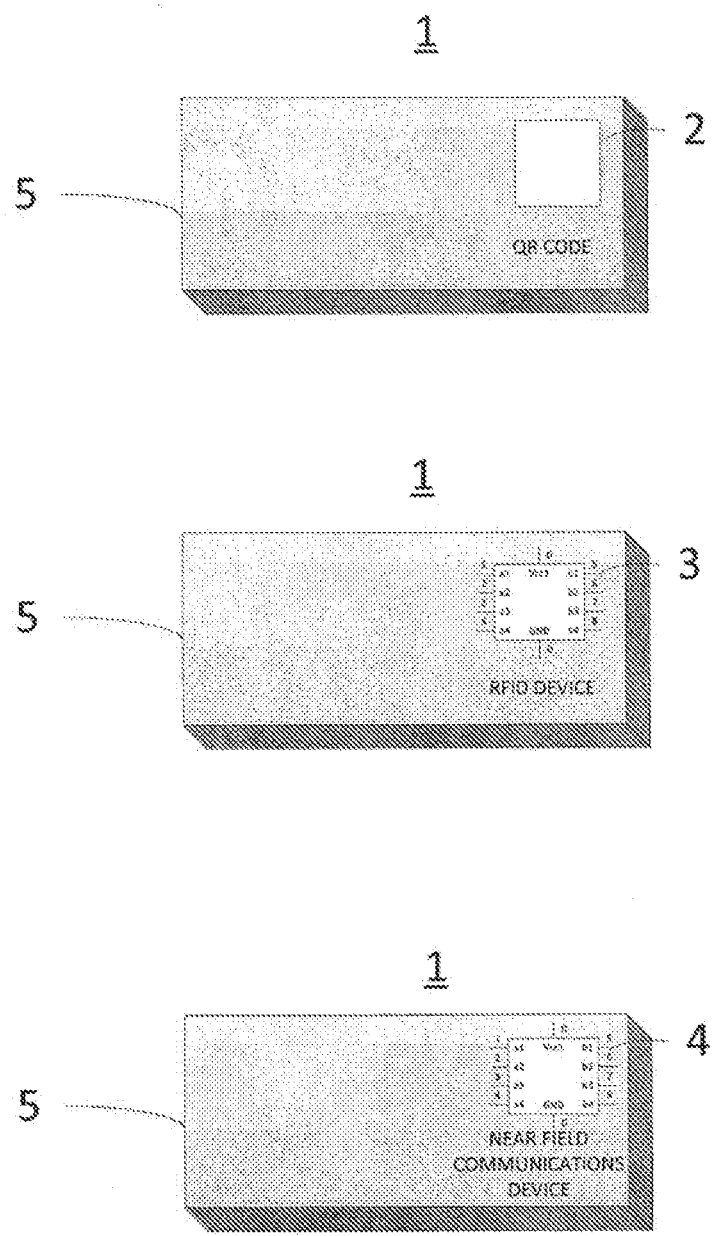
FIG. 1 is an illustration of examples of food packaging in accordance with an embodiment of the present invention.

FIG. 1 provides illustrations of exemplary food packaging in accordance with an embodiment of the present invention. Food is packaged in cardboard containers on which encoded information is printed or where encoded information is held. As illustrated in FIG. 1, food packaging in accordance with an embodiment of the present invention is in multiple forms. Encoded information readable or detectable by a sensor, reader or detector associated with cooking apparatus is contained on or within the food packaging. The encoded information is described in connection with FIG. 2.

As illustrated in FIG. 1, in a first example of food packaging 1 in accordance with the present information, the encoded information is printed on the enclosure 5 in the form of a QR-code 2. This QR-code 2 is readable by an optical reader (illustrated as element 14 in FIGS. 3-4) associated with the cooking apparatus. Alternative printable information such a bar codes and paper data storage are other printable means to implement the present invention.

FIG. 1 shows a second example of food packaging 1 in accordance with the present invention using an RFID device 3. The RFID device 3 is attached to the inside of enclosure 5 or incorporated as part of enclosure 5. The encoded information is held in RFID device 3. RFID device 3 is readable by an RFID reader associated with the cooking apparatus 9. The RFID reader (illustrated as element 14 in FIGS. 3-4) emits an energizing signal which energizes the RFID device 3 associated with the food packaging. The energization of the RFID device 3 causes the encoded information contained thereon to be emitted so it is read by the RFID reader.

FIG. 1 shows a third example of food packaging 1 in accordance with the present invention using near field communication technology 4. Near field communication, abbreviated NFC, is a form of contactless communication between devices. Contactless communication allows a user to wave the food package over a NFC compatible device (illustrated as element 14 in FIGS. 3-4) to send information without needing to touch the devices together or go through multiple steps setting up a connection. The encoded information is read by the NFC compatible device associated with the cooking apparatus.

FIG. 2 depicts alternative formal descriptions of digital message formats in accordance with the present invention. A first field is the food identifier. The food identified identifies the food that is packaged. A second field is the food quantity. The food quantity identifies the amount of food packaged by the food packaging. The third field include the batch identifier and expiration date. The batch identifier identified that batch from which the food that is packaged comes. The expiration date is the date on which the food is set to expire. A fourth field is the IP address. The IP address indicates the IP address of the remote computer or server associated with the food that is packaged. It allows the cooking apparatus to access one or more web pages associated with the food. The next field includes a first process identifier and first process information. The food process identifier informs the cooking apparatus a first step to be performed on the food. The first process information is one or more parameters to be used by the cooking apparatus in connection with the first food process. The message format allows for n different process identifiers and process information fields. An end of message field (not depicted) follows the nth process identifier and process information field. A variable length digital message format is also show on FIG. 2.

When the food packaging is brought proximate to the cooking apparatus, the digital message associated with the food packaging is read by the cooking apparatus. The read digital message provides the cooking apparatus information needed to prepare and/or cook the food. By way of example and without limiting the scope of the invention, suppose the user has purchased a frozen dinner requiring a removal from the box first step, a defrost second step at a first temperature for a first duration, a remove the film third step, a cooking fourth step at a second temperature for a second duration, and a mixing fifth step. The "REMOVE FOOD FROM THE BOX" step would be encoded in the first process identifier. The "DEFROST" step would be encoded in the second process identifier and the defrost temperature and defrost time would be indicated in the second process information. The "REMOVE THE FILM" step would be encoded in the third process identifier. The "COOKING" step would be encoded in the fourth process identifier and the cooking temperature and cooking time would be indicated in the fourth process information. The "MIXING" step would be encoded in the fifth process identifier. By reading the digital message, the cooking apparatus would have the information necessary to properly cook the meal without further input by the user.

When different cooking apparatuses can be used to cook the same food (e.g., a frozen dinner can be cooked in a microwave, a conventional oven and a toaster oven), the process identifiers identify whether the process is to be used for cooking in a microwave, a conventional oven or a toaster oven. This identification is achieved by through coding, ordering or some combination of the two. Preferably, the process identifiers and process information fields associated with a first cooking apparatus are listed first (e.g., the microwave oven cooking instructions are listed first), followed by the process identifiers and process information fields associated with a second cooking apparatus are listed second (e.g., the conventional oven cooking instructions are listed second), followed by the process identifies and process information fields associated with a third cooking apparatus are listed third (e.g., the toaster oven cooking instructions are listed third), and so on. When the food packaging is brought proximate to the chosen cooking apparatus, the digital message associated with the food packaging is read by the cooking apparatus. The software of the chosen cooking apparatus uses the cooking instructions corresponding to the chosen cooking apparatus.

In the embodiments described below in which the cooking apparatus is connectable to a remote computer or server via the internet (see FIG. 5), the cooking instructions could be remotely located on the remote computer or server, thereby eliminating the need for including the cooking instructions on the packaging. The cooking apparatus need only read the food identifier, the batch identifier, the expiration date and IP address. The cooking apparatus contacts the remote computer or server via running a browser running on the microprocessor 25 (FIG. 4) using the IP address. The cooking apparatus provides the food identifier, batch identifier, and expiration date to the remote computer or server. The remote computer or server, using the food identifier, batch identifier and expiration date, looks up the appropriate cooking steps for that particular food and provide the steps to the cooking apparatus over the Internet.

Figure 3:
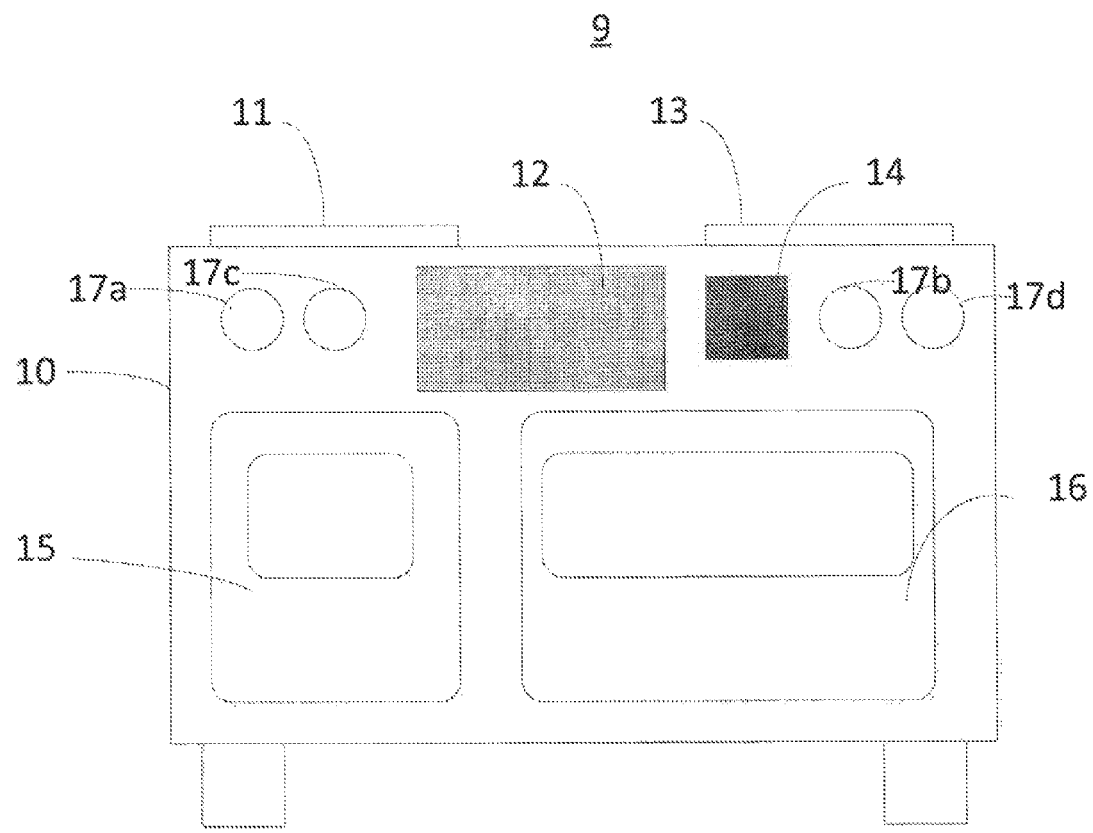
FIG. 3 is a front view of a cooking apparatus in accordance with an embodiment of the present invention.

FIG. 3 depicts a cooking apparatus 9 according to the present invention. FIG. 3 illustrates a traditional oven with stove top. It is understood that the principles of the present invention are equally applicable to microwave ovens, toaster ovens, convention ovens, or any other type of cooking apparatus. As illustrated in FIG. 3, cooking apparatus includes cooking housing 10 which houses ovens 15 and 16, stoves 11 and 13, and manually actuatable input devices (depicted as a control, knobs) 17a, 17b, 17c, and 17d. Manually actuatable input devices 17b and 17c control the cooking temperature of ovens 15 and 16. Manually actuatable input devices 17a and 17d control the cooking temperature of stove 11 and 13.

Cooking housing 10 also houses contact-sensitive flat panel display 12 and detector/reader 14. A cook according to the present invention brings food packaging 1 illustrated in FIG. 1 proximate to the detector/reader 14. The detector/reader 14 reads the encoded information associated with food packaging 1. The contact-sensitive flat panel display 12 displays information useful to the cook in the cooking process. Examples of the information displayed to the cook are provided and descried in connection with FIGS. 6-8. Contact-sensitive flat panel display 12 is preferably seated within an indentation in the housing 10 so the planer surface of the display is coplanar to the surface of the house. Flat panel display 12 is advantageously detachably attached to the cooking housing 10 and includes a rechargeable battery. The back of the contact-sensitive flat panel display 12 includes electrical contacts to facilitate communication between the display 12 and the controller 20 (FIG. 4) and recharging. The back of the contact-sensitive flat panel display 12 also includes a stand for allowing display 12 to be propped up in a substantially vertical orientation to facilitate the viewing of the cooking steps while the cook performs the cooking steps. Detachable attachment is achieved through the use of Velcro®, magnetic coupling, or physical coupling using male-female connectors that are attached and detached. When detached, contact-sensitive flat panel display 12 continues to operate in accordance with the principles of the present invention through a wireless or wired connection to the cooking apparatus 9. Examples of wireless connections include Bluetooth® or an 802.11 WIFI connection. When attached, electrical contacts on the back of the contact-sensitive display 13 are in contact with electrical contacts within the indentation to allow for communication with the controller 20 and recharging of the rechargeable battery.

Figure 4:
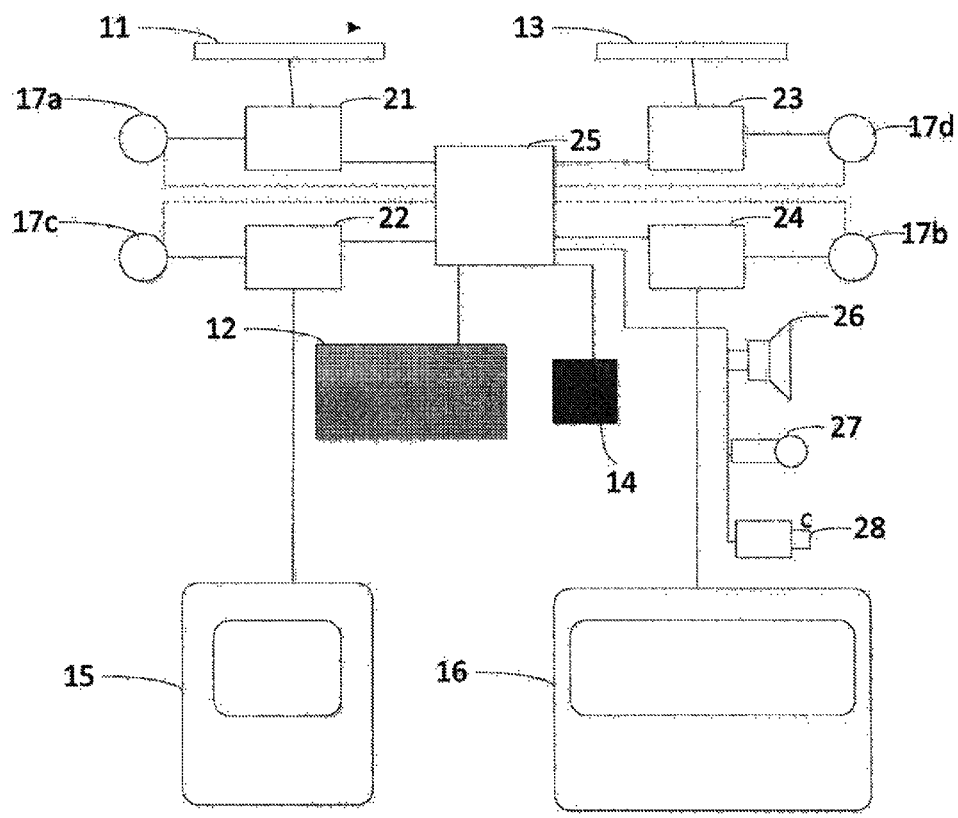
FIG. 4 is a schematic illustration of the control system of a cooking apparatus in accordance with an embodiment of the present invention.

FIG. 4 depicts a controller of the cooking apparatus according to an embodiment of the invention. Controller 20 includes microprocessor 25 which serves as the brain center of the cooking apparatus 9. Controller 20 also includes heating element controllers 21, 22, 23 and 24. Heating element controllers 21 and 23 control the heating of stove elements 11 and 13. If stove elements 11 and 13 are gas stoves, heating element controllers 21 and 23 control the flow of gas to the burners (not shown). If stove elements 11 and 13 are electric stoves, heating element controllers 21 and 23 control the flow of electricity to the electrical heating elements (not shown). Heating element controllers 22 and 24 control the heating of ovens 15 and 16. If ovens 15 and 16 are gas ovens, healing element controllers 22 and 24 control the flow of gas to the oven burners (not shown). If ovens 15 and 16 are electric ovens, heating element controllers 22 and 24 control the flow of electricity to the electrical heating elements (not shown).

FIG. 4 depicts two alternatives regarding driving or directing the heating element controllers. In a first embodiment, manually actuatable input devices (e.g., control knobs) 17a, 17b, 17c and 17d are connected to the heating element controllers 21, 22, 23 and 24. The connection are mechanical, electrical or a combination of the two. When a cook manually actuates the input device (in the case of control knobs, by turning), the connection communicates to the heating element controller to increase or decrease the flow of heat supply to the heating element, electricity in the case of electric heating elements and gas in the case of gas heating elements.

In the second embodiment illustrated by the dashed lines in FIG. 4, manually actuatable input devices (e.g., control knobs) 17a, 17b, 17c and 17d are connected to the heating element controllers 21, 22, 23 and 24 by way of the microprocessor 25. When a cook manually actuates the input device (in the case of control knobs, by turning), the connection communicates to microprocessor 25 that the cook would like to adjust the amount of heat output by the heating element. As a result, the microprocessor 25 directs the heating element controller to increase or decrease the flow of heat supply to the heating element, electricity in the case of electric heating elements and gas in the case of gas heating elements.

As depicted in FIG. 4, detector/reader 14 is connected to microprocessor 25. Microprocessor 25 in turn is connected to the heating element controllers 21, 22, 23 and 24. When food packaging 1 according to the present invention is brought proximate to detector/reader 14, detector/reader 14 reads the information contained on or within the food packaging 1. The detector/reader 14 converts the information into a form readable by microprocessor 25 and sends the information to microprocessor 25. Microprocessor 25 receives the information sent by detector/reader 14 and uses that information to direct the heating element controllers 21, 22, 23, and 24 to increase or decrease the flow of heat supply to the heating element in accordance with the cooking instructions associated with the food packaging.

As depicted in FIG. 4, microprocessor 25 is connected to the contact sensitive flat panel display 12. Microprocessor 25 is capable of displaying images on the contact sensitive flat panel display 12. Microprocessor 25 is capable of receiving inputs from the cook/user via the contact sensitive flat panel display 12. The cook/user contacts the contact sensitive flat panel display 12 in response to images displayed on the flat panel display 12. By making contact with the flat panel display, the cook for example makes a selection, changes or adjusts a recipe step, browses for recipes, orders food to make a particular recipe, etc. Microprocessor 25 displays one or more images of a QUERTY keyboard or other keyboard configurations such as those displayed on iPHONE and iPAD devices. The cook keys in letters, words and symbols using the displayed keyboard.

As depicted in FIGS. 3 and 4, cooking apparatus 9 includes a speaker 26, microphone 27 and web camera 28. Speaker 26, microphone 27 and web camera 28 are under the control of microprocessor 25 either directly or through the I/O controller 31. Speaker 26 provides audible output to the cook/user. The audible output includes pings, beeps, and other indication sounds to notify the cook/user mat for example an input is required from the cook/user or that a certain cooking stage has been achieved. The audible output also includes sound coordinated with images displayed with the contact sensitive flat panel display 12. For example, a cooking tutorial performed by a remotely located cook is displayed on the flat panel display 12. Speaker 26 will output the voice of the remotely located cook as the audible output. Microphone 27 detects audible sounds produced by the cook/user as well as the cooking apparatus and sends them to microprocessor 25. The detected audible sounds are used locally by the microprocessor 25 and/or sent remotely by microprocessor 25 via the Internet to a remote location. Speech recognition software locally located on microprocessor 25 or remotely located on a remote computer deciphers any verbal outputs by the cook/user. Web camera 28 allows the cook to engage in a video call with a remotely located chef as described below.

Although not depicted in FIGS. 3 and 4, oven 9 and controller 20 optionally includes feedback sensors connected to microprocessor 25. One feedback sensor is a food temperature sensor or probe. A cook will be instructed by the recipe by way of the flat panel display to insert the food temperature sensor into or proximate to the food being cooked. Software or firmware running on the microprocessor reads the temperature detected by the food temperature sensor and adjusts the cooking steps to achieve the desired doneness. A second type of feedback sensors are a plurality of safety sensors. These safety sensors will monitor the environment around the oven to ensure that the conditions remain safe for cooking. These sensors include smoke detectors, fire detectors, carbon monoxide detectors, and temperature detectors. If microprocessor 25 determines that there is an unsafe environment for cooking because of receiving an abnormal reading from one or more of the safety detectors, the microprocessor will cause the heating element controllers to shut cooking down. A third feedback sensor are the sensors that determine the cooking temperature of the oven or stove.

Figure 5:
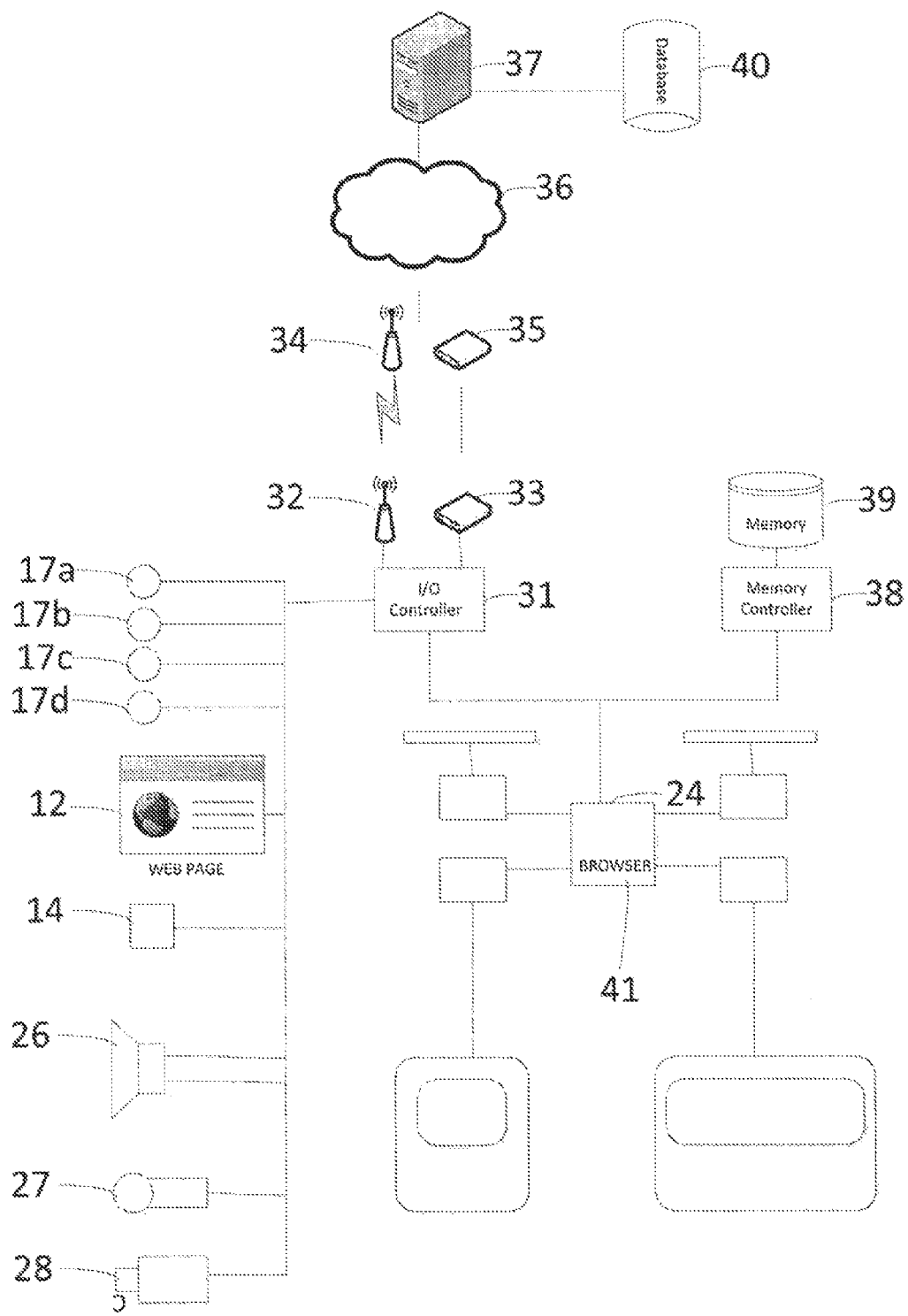
FIG. 5 is a schematic illustration of the control system of a cooking apparatus connected to a remote server over the Internet or other network in accordance with an embodiment of the present invention.

In accordance with another embodiment of the invention, as depicted in FIG. 5, the cooking apparatus further comprises an I/O controller 31 and a communication device such as an IEEE 802.11 WIFI device 32 or Ethernet device 33 for allowing the cooking apparatus to bidirectionally communicate with a remotely located server 37 via the Internet 36 or other network. The cooking apparatus sends and retrieves cooking information to and from the remote server 37 via the Internet connection. As a result, an enhanced interaction between the cooking apparatus and user of the cooking apparatus is achieved. The I/O controller 31 may also control and serve as the interface between microprocessor 25 and one or more of the manually actuates the input devices 17a, 17b, 17c, and 17d, detector/reader 14, contact sensitive flat panel display 12, speaker 26, microphone 27 and web camera 28.

As depicted in FIG. 5, the cooking apparatus further includes a memory controller 38 and memory 39. The cooking apparatus stores and retrieves cooking information to and from the memory 39 via the memory controller 38. As a result, an enhanced cooking apparatus is provided which allows the cooking apparatus to store information particular to the cook/user, including cooking preferences, recipes, and software applications.

FIGS. 6-8 depict examples of images to be displayed on the contact sensitive flat panel display in accordance with the present invention. While the example images that are depleted are textual in nature, it is understood that highly graphical images including pictures, illustrations, drawings, videos are other examples of images to be displayed on the contact sensitive flat panel display in accordance with the present invention. An advantage of employing a contact sensitive flat panel display in the present invention is to create a highly interactive, user-friendly graphical environment which will facilitate the ease of cooking.

The images are generated by software running on microprocessor 25 or on remote server 37 or a combination of both. The software receives as input the information read from the food packaging by the decoder/reader. As a result of receiving the information from the food packaging, the software knows the identification of the food, the batch from which the food comes, the expiration date, and the steps necessary to properly prepare and cook the food. Using this information as well as information about the model and make of the cooking apparatus, the software generates a set of graphical images on the contact-sensitive flat panel display to create a friendly graphical user environment to walk the cook step by step through the proper preparation and cooking of the food.

The cooking instructions could be as simple as "PRESS START." The cooking instruction may be more complex as requiring the cook/user to prepare the food. Such instructions included "INSERT IN OVEN", "REMOVE FILM", "LIFT CORNER OF FILM", "PUNCTURE FILM", "LET STAND", "COOL", "CUT", "CHOP", "CUBE", "SLICE, "TENDERIZE", "ADD <INGREDIENT>", "REDUCE", "DEGLAZE", "BOIL", "SIMMER", "MARINATE", "DEFROST", "SALT", etc. The process information may provide further details above the various cooking/preparation steps. For example, regarding the "ADD <INGREDIENT>" step, the process information will inform the cook/user the <INGREDIENT> to be added, for example salt, water, oil, pepper, as well as the amount of the <INGREDIENT>.

When the cook has been instructed to perform a cooking/preparation step, the software will prompt the user to "PRESS NEXT STEP" after the cook/user has completed the cooking/preparation step. The cooking instructions will also give the cook/user the option to "GO BACK TO PREVIOUS STEP."

The cook is not required to set the temperature or duration of the various cooking steps on the oven. The software obtains that information from the food packaging and instructs the heating element controllers to heat the stove and oven elements to the appropriate temperature for the appropriate duration. The software receives feedback from temperature probes placed in the food and the other feedback sensors and adjusts the temperature and duration appropriately. The software may adjust various cooking steps (e.g., cooking temperatures, cooking times) to account for variations associated with the different makes and models of cooking apparatuses.

In embodiments of the invention in which the cooking apparatus is connected via the Internet to a remote computer or server, the information on the food packaging regarding all of the steps necessary to properly prepare and cook the food may be either replaced by or supplemented with information resident on the remote computer/server. Using the IP address read from the food packaging, the cooking apparatus contacts the remote computer/remote server via a web browser 41 running on microprocessor 25. The cooking apparatus 9 provides the remote computer/server 37 with the identification of the food, the quantity of food, the batch from which the food comes, the expiration date read from the food packaging. In addition, the cooking apparatus 9 provides the remote computer/server information about the make, model and location of the cooking apparatus.

The remote computer/server 37 receives the identification of the food, the quantity of food, the batch from which the food comes and the expiration date read from the food packaging and the information about the make, model and location of the cooking apparatus 9. The remote computer/server 37 looks up in its database 40 the proper preparation and cooking instruction associated with the food identified by one or more of the identification of the food, the quantity, the batch from which the food comes and the expiration date. The remote computer/server may modify or customize the proper preparation and cooking instruction to take into account the quantity of food as well as the make, model, and location of the cooking apparatus. For example, certain models of microwave ovens may be known to the remote computer/server to cook at a higher intensity than other models and therefore the cooking instructions may be modified to account for these differences. In addition, the location of the cooking apparatus may indicate that the cooking will be performed at a higher elevation which affects cooking times. Cooking instructions may be modified to account for these differences.

According to an alternative embodiment of the present invention, there are a plurality of remote computers/servers, each of which has a plurality of recipes maintained thereon. These remote computers/servers are searchable using web browser 41 and an appropriate search engine maintained on microprocessor 25 or by third party. The cook enters a particular food he/she wants to make—for example "meat lasagna"—into the search engine. The search engine will conduct a search and identify one or more recipes for "meat lasagna" on the one or more remote computers/servers. Some of the recipes located by the search will have an "I WANNA COOK IT" logo associated with it. (Other logos or indicia are applicable to the present invention.) When the cook selects an "I WANNA COOK IT" recipe, the cook will be directed to a remote computer/server such as remote computer/server 37.

The remote computer/server 37 has or generates a set of web pages that provides step by step instruction to walk the cook using the cooking apparatus 9 through the proper preparation and cooking of the food identified by the food packaging 1 or the "I WANNA COOK IT" recipe. The web pages are served by the remote computer/server 37 to the cooking apparatus 9 over the Internet. The web pages are displayed on the contact-sensitive flat panel display 12. The web pages are displayed in the context of a web browser 41 running on microprocessor 25. The cook navigates through the cooking instructions. The cook uses the forward and back arrows and home screen to navigate through the cooking instructions via the web browser. In addition, after a web page has provided instructions to the cook about how to complete the next step, the web page displays a button with the phrase "NEXT STEP" which allows the cook to navigate to the next step by pressing the "NEXT STEP" button on the web page. The web pages also display a "PREVIOUS STEP" button which give the cook/user the option to navigate to the previous step in the preparation/cooking process.

The web pages are contextually divided into four categories; INTRODUCTORY PAGES, PREPARATION PAGES, COOKING PAGES, and FINISHING PAGES. Remote server 37 interrogates the cook using the INTRODUCTORY PAGES to determine what the cook is planning to cook. If the cook has been directed to remote computer/server 37 by bringing packaging in accordance with the present invention proximate to reader 14 and having it read thereby, server 37 knows that the cook typically wants to cook at least something associated with the food contained in the food packaging (although the cook may use food packaging simply to access remote server 37). The INTRODUCTORY PAGES will query whether the cook wants to:
  (1) SIMPLY COOK THE [CONTENTS OF THE FOOD PACKAGING]
  (2) USE THE [CONTENDS OF THE FOOD PACKAGING] TO COOK AN "I WANNA COOK IT" RECIPE
  (3) SEARCH FOR ANOTHER "I WANNA COOK IT" RECIPE
  (4) HELP ME
  (5) SPEAK AN EXPERT If the cook selects (1), the cook is asked if he/she wants to cook the entire package or a portion of the package. The cook is asked how he/she wants to cook the food. Upon receiving the answer to those inquiries, the cook will be directed to the PREPARATION PAGES.

If the cook selects (2), the cook searches for an I WANNA COOK IT recipe using the contents of the food packaging. For example, if the cook has passed a package of ground beef in front of the reader and the cook selects "USE THE GROUND BEEF TO COOK AN "I WANNA COOK IT" recipes, the cook will be able to search all of the I WANNA COOK IT recipes using ground beef—e.g., hamburgers, meatloaf, lasagna, etc. The cook selects the desired I WANNA COOK IT recipe, and flow proceeds to "I WANNA COOK IT" as described below.

If the cook selects (3), the cook searches for an I WANNA COOK IT recipe and selects a desired I WANNA COOK IT recipe or if the cook has been directed to remote computer/server 37 by selecting an I WANNA COOK IT recipe, the INTRODUCTORY PAGES will query whether the cooks wants to:
  (1) COOK THE "I WANNA COOK IT" RECIPE FOR [SELECTION]
  (2) SEARCH FOR ANOTHER "I WANNA COOK IT" RECIPE
  (3) HELP ME
  (4) SPEAK WITH AN EXPERT If the cook selects (1), flow proceeds to "I WANNA COOK IT." The cook is asked about the quantity—whether the cook wants to use the I WANNA COOK IT recipe to cook for one individual, two individuals, three individuals and so on. Using the I WANNA COOK IT recipe and the quantity information, the computer/server 37 generates an ingredient list including quantities to make the recipe with places to put check marks next to each ingredient. The web page asks the cook to check all of the boxes corresponding to those ingredients the cook has available to use in the recipe. The cook checks the corresponding boxes by making contact with the contact sensitive screen. If the cook has checked all of the boxes, the system will state that YOU HAVE ALL THE INGREDIENTS!! and the cook will be directed to the PREPARATION PAGES. If the cook does not check all of the boxes, the system will prompt the whether the cooks wants to:

(1) PRINT UP A SHOPPING LIST
(2) HAVE AN ASSOCIATED MARKET COLLECT THE MISSING AND PREPARE THE MISSING INGREDIENTS
(3) SEARCH FOR ALTERNATIVE INGREDIENTS
(4) RETURN TO PRIOR MENU

If the cook selects (1), the cooking apparatus causes a printer associated with the home wifi network to print up a shopping list of missing ingredients and quantities. If the cook selects (2), the list of missing ingredients is transmitted to an associated market geographically nearby the cooking apparatus. The associated market collects the missing ingredients and prepares them for pick-up by the cook of delivery to the cook. If the user selects (3), the system offers ingredients that may be used as an alternative to the original ingredients and describes the change to the cook. If the user selects (4), the cook is returned to the prior menu.

The PREPARATION PAGES are designed to help the cook get to the cooking process. The PREPARATION PAGES may simply be an instruction to insert the food into the oven. The PREPARATION PAGES may also be a set of detailed set of step-by-step instructions designed to help the cook get everything read for cooking, including cutting food, marinating meats, combining ingredients, etc. With each step, a animated pictorial/graphical illustration of the step is displayed on the contact-sensitive display 12 to provide the cook an illustration of what exactly the cook is supposed to do on this step. For example, an animation of a cook cutting carrots would be displayed in the step is to cut a carrot. An animation of a cook adding sale would be display if the step is to add salt. An animation of a cook sautéing onions would be displayed if the step is to sauté onions. A video or a link to a video showing a video representation of the step is all provided to the cook. The cook selects the video link by causing contact with the contact sensitive display. After a web page has provided instructions to the cook about how to complete the next step, the web page displays a button with the phrase "NEXT STEP" which allows the cook to navigate to the next step by pressing the "NEXT STEP" button on the web page. The web pages also display a "PREVIOUS STEP" button which give the cook/user the option to navigate to the previous step in the preparation process.

The COOKING PAGES are designed to help the cook cook the food. Exemplary cooking pages are provided in FIGS. 6-8. Cooking temperatures and cooking durations are set by microprocessor 25 as instructed by the software and/or remote computer/server 37. Indications of cooking temperatures and cooking durations are shown on the contact-sensitive display. Cooking temperature and cooking durations may be adjusted based on feed-back of doneness received from the feedback sensors. Cooking temperature and cooking duration may also be adjusted based on feedback of doneness received from the cook as illustrated in FIG. 8 Similar to the PREPARATION PAGES, animated illustrations of the step is displayed on the contact-sensitive display 12 to provide the cook a pictorial illustration of what the cook is supposed to do. A video or link to a video showing a video representation of the step is all provided to the cook. The cook selects the video link by causing contact with the contact sensitive display. After a web page has provided instructions to the cook about how to complete the next step, the web page displays a button with the phrase "NEXT STEP" which allows the cook to navigate to the next step by pressing the "NEXT STEP" button on the web page. The web pages also display a "PREVIOUS STEP" button which gives the cook/user the option to navigate to the previous step in the cooking process.

The web pages display a "HELP ME" button and a "SPEAK WITH AN EXPERT" button which the cook/user selects by contacting the appropriate portion of the contact-sensitive display screen 12. When the cook selects "HELP ME", the remote server serves web pages design to specifically help the cook with the step the cook is performing including animated graphical illustrations and or action videos of the step.

When the cook selects "SPEAK WITH AN EXPERT" the web browser indicates to the remote server 37 to open a chat window through which the cook chats with an expert. Packaged food producers traditionally establish relationships with chefs featured on the Food Network® such as Bobby Flay, Michael Symon, or Rachel Ray to promote their food. An advantage of the present invention is that producers of packaged food attract additional customers and increase sales by promoting the ability of the customers to directly connect with these celebrity chefs through the use of the present invention. The packaged food producers advertise on their packaging that if the food customer purchases a food package according to the present invention, the customer gains access to the celebrity chefs associated with the packaged food producer. The packaged food producer advertises that the celebrity chef would be webcasting at a certain date and time. Alternatively, packaged food producers create loyalty programs such that if after the customer purchases a certain quantity of food, the customer gains access to certain celebrities and special recipes.

Figure 9:
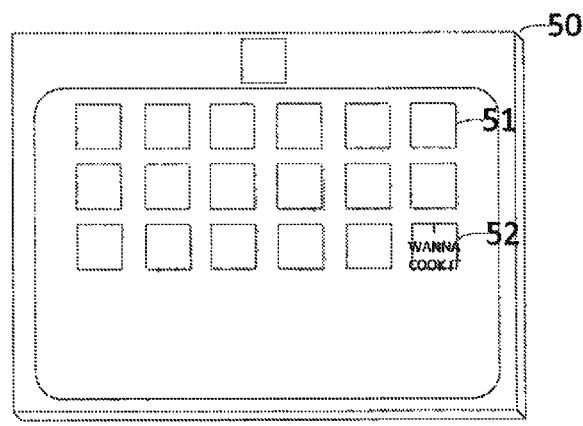
FIG. 9 is a front view of a pad-like computer device in accordance with an embodiment of the present invention.

FIG. 9 depicts a pad-like computing device or smartphone 50. Pad-like computing devices and smartphones are well known. They include Apple's iPad® and iPhone®, and Samsung Galaxy® SIII and Note II. These pad-like computer devices and smartphones 50 includes a plurality of software applications 51 including a software application 52 according to the present invention. An individual using pad-like computing device or smartphone 50 launches software application 52. Pad-like computer device or smartphone 50 operates in a manner similar to the embodiments described above. The individual using the device 50 reads and decodes QR codes via the camera or other sensor associated with the device 50. When the individual uses the device 50 to read food packaging having a QR code in accordance with the present invention, the individual will be directed by the web browser running on the device 50 to remote computer/server 37. The individual using device 50 searches for recipes using the web browser running on the device. The web browser locates a plurality of recipes on a plurality of servers. The individual selects a recipe associated with the "I WANNA COOK IT" logo. The individual is directed to a remote computer/server such as remote computer server 37. Similar to the embodiments described above, remote computer/server 37 has or generates a set of web pages that provides step by step instruction to walk cook through the proper preparation and cooking of the food identified by the food packaging 1 or the "I WANNA COOK IT" recipe. The web pages are served by the remote computer/server 37 to device 50 over the Internet. The web pages are displayed on the contact-sensitive flat panel display of device 50. The web pages are displayed in the context of a web browser 41 running on the pad-like computing device 50. The cook navigates through the cooking instructions. The cook uses the forward and back arrows and home screen to navigate through the cooking instructions via the web browser. Device 50 uses a wireless connection to control the cooking apparatus 9. Examples of wireless connections include Bluetooth® or an 802.11 WIFI connection.

The software application 52 prompts the user to enter information about the make, model and location of the cooking apparatus 9. The information amount the make, model and location of the cooking apparatus 9 is sent to remote computer/server 37. Remote computer/server 37 may modify or customize the proper preparation and cooking instruction to take into account the make, model and location of the cooking apparatus. For example, certain models of microwave ovens may be known to the remote computer/serve to cook at a higher intensity than other models and therefore the cooking instructions are modified to account for these differences. In addition, the location of the cooking apparatus may indicate that the cooking will be performed at a higher elevation which affects cooking times. Cooking instructions are modified to account for these differences.

Although this invention has been disclosed in the context of certain preferred embodiments and examples, it will be understood by those skilled in the art that the present invention extends beyond the specifically-disclosed embodiments to other alternative embodiments and/or uses of the invention and obvious modifications and equivalents thereof. In addition, while a number of variations have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. Accordingly, it should be understood that various features and aspects of the disclosed embodiments can be combined with or substituted for one another in order to form varying modes of the disclosed apparatus. Thus, it is intended that the scope of the present invention should not be limited by the particular disclosed embodiments described above, but should be determined only by a fair reading of the claims that follow.

What is claimed is:

1. A system for cooking comprising:
   a cooking apparatus having
      a housing containing a controllable cooking element for cooking food, the cooking housing supporting at least one manually actuatable input device for manually inputting an instruction to cook the food and a sensor for sensing first information from an enclosure for enclosing food brought proximate to the housing;
      a microprocessor contained within the housing for receiving second information from the sensor relating to the first information sensed from the enclosure;
      the manually actuatable input device controllably connected to the controllable cooking element for controlling the cooking of food, and
      the microprocessor controllably connected to the controllable cooking element for controlling the cooking of food based on the second information; and
   a portable electronic flat panel device having a sensor for sensing first information from an enclosure for enclosing food brought proximate to the housing;
      a microprocessor contained within the portable electronic flat panel device for receiving third information from the sensor relating to the first information sensed from the enclosure;
      the portable electronic flat panel device capable of communicating with the cooking apparatus fourth information corresponding to instructions to cook of the enclosed food.

2. The cooking system of claim 1, wherein the first information comprises instructions for cooking the enclosed food, the cooking instructions including at least one cooking level and one duration for cooking the enclosed food.

3. The cooking system of claim 1, wherein the first information comprises an identifier associated with the enclosed food.

4. The cooking system of claim 1, wherein the first information comprises a quantity of associated with the enclosed food.

5. The cooking system of claim 1, wherein the cooking instructions includes a second cooking level and a second duration for cooking the enclosed food.

\* \* \* \* \*